United States Patent
Matsumoto et al.

(10) Patent No.: US 7,964,660 B2
(45) Date of Patent: Jun. 21, 2011

(54) PROCESS FOR PRODUCING AQUEOUS PIGMENT DISPERSION

(75) Inventors: Toshiyuki Matsumoto, Wakayama (JP); Tsuyoshi Oda, Wakayama (JP); Koji Kamei, Wakayama (JP); Toshiya Iwasaki, Wakayama (JP)

(73) Assignee: Kao Corporation, Tokyo (JP)

( * ) Notice: Subject to any disclaimer, the term of this patent is extended or adjusted under 35 U.S.C. 154(b) by 477 days.

(21) Appl. No.: 12/065,779

(22) PCT Filed: Sep. 5, 2006

(86) PCT No.: PCT/JP2006/317495
§ 371 (c)(1),
(2), (4) Date: Aug. 4, 2008

(87) PCT Pub. No.: WO2007/029669
PCT Pub. Date: Mar. 15, 2007

(65) Prior Publication Data
US 2009/0124739 A1  May 14, 2009

(30) Foreign Application Priority Data

Sep. 5, 2005 (JP) .................. 2005-256815

(51) Int. Cl.
*C08K 3/02* (2006.01)
(52) U.S. Cl. ........ 524/364; 523/160; 523/161; 523/319; 524/356; 524/556
(58) Field of Classification Search .................. 523/160, 523/161, 319; 524/356, 364, 556
See application file for complete search history.

(56) References Cited

U.S. PATENT DOCUMENTS 7,291,659 B2 * 11/2007 Tsuru et al. .......... 523/160
2005/0009951 A1 * 1/2005 Hama et al. .......... 523/160

FOREIGN PATENT DOCUMENTS

| JP | 07 238234 | 9/1995 |
|----|-----------|--------|
| JP | 2003 301122 | 10/2003 |
| JP | 2004 131586 | 4/2004 |
| JP | 2004 263035 | 9/2004 |
| JP | 2005 015550 | 1/2005 |
| JP | 2005 041992 | 2/2005 |
| JP | 2005 048014 | 2/2005 |
| JP | 2005 060431 | 3/2005 |

* cited by examiner

*Primary Examiner* — David Wu
*Assistant Examiner* — Marie Reddick
(74) *Attorney, Agent, or Firm* — Oblon, Spivak, McClelland, Maier & Neustadt, L.L.P.

(57) ABSTRACT

The present invention relates to a process for producing a water-based pigment dispersion which includes a first step of mixing (A) an emulsion composition including a water-insoluble polymer having a specific weight-average molecular weight and containing a salt-forming group, an organic solvent having a specific solubility in water, a neutralizing agent and water, with (B) a pigment to obtain a preliminary dispersion having a content of non-volatile components of from 5 to 50% by weight and a weight ratio of the organic solvent to water [organic solvent/water] of from 0.1 to 0.9; a second step of continuously dispersing the preliminary dispersion by using a media-type dispersing device and continuously separating the resultant dispersion from media particles; and a third step of further dispersing the resultant dispersion by using a homogenizer, as well as a water-based ink for ink-jet printing containing the water-based pigment dispersion which not only satisfies a high optical density but also exhibits excellent gloss and rubbing resistance.

8 Claims, 3 Drawing Sheets

Single Tank Circulation Method

Mixing or Stirring Device

Media-type Dispersing Device

Twin Tank Liquid Feedback Method

Mixing or
Stirring Device

Media-type
Dispersing Device

Sand Grinder

PROCESS FOR PRODUCING AQUEOUS PIGMENT DISPERSION

FIELD OF THE INVENTION

The present invention relates to a process for producing water-based pigment dispersions, and water-based inks for ink-jet printing.

BACKGROUND OF INVENTION

In ink-jet printing methods, droplets of ink are directly projected onto a recording medium from very fine nozzles and allowed to adhere to the recording medium, to form characters and images. The ink-jet printing methods have been rapidly spread because of their various advantages such as easiness of full coloration, low costs, capability of using a plain paper as the recording medium, non-contact with printed images and characters, etc. Among such printing methods, in view of enhancing a light resistance and a water resistance of the images and characters printed, an ink-jet printing method utilizing an ink containing a pigment has now come to dominate. In recent years, there is a further demand for pigment-containing inks having the same gloss as that of dye-containing inks.

There is generally known such a method for producing pigment-containing inks in which the pigment is dispersed in a liquid medium such as water and an organic solvent in the presence of a dispersant.

For example, Patent Document 1 discloses a method of dispersing a pigment together with a dispersant by means of a high-speed mill using a fine grinding medium. In the Patent Document 1, as the method of finely grinding the pigment, there are described a continuous media recirculation pulverization method and a mixed media pulverization method. In these methods, a slurry containing the fine grinding medium, liquid, pigment and dispersant is circulated through the system, and after completion of the pulverization, the resultant pigment dispersion is separated from the fine grinding medium by mechanical methods such as screening and filtration. However, in these conventional pulverization methods, the separation procedure requires a prolonged period of time, and the yield of the pigment dispersion tends to be lowered.

Also, Patent Document 2 discloses such a method of grinding a pigment together with a dispersion of a resin having a weight-average molecular weight of from 9,000 to 80,000 and further finely dividing the thus ground pigment using a homogenizer. However, in this method, since the resin used therein is a styrene/maleic acid copolymer or a styrene/acrylic acid copolymer having a weight-average molecular weight of 80,000 or less, there tends to arise such a problem that the obtained dispersion fails to exhibit excellent storage stability and gloss.

Patent Document 1: JP 9-176543A
Patent Document 2: JP 2005-41992A

SUMMARY OF THE INVENTION

The present invention relates to [1] a process for producing a water-based pigment dispersion which includes (1) a first step of mixing (A) an emulsion composition including a water-insoluble polymer having a specific weight-average molecular weight and containing a salt-forming group, an organic solvent having a specific solubility in water, a neutralizing agent and water, with (B) a pigment to obtain a preliminary dispersion having a content of non-volatile components of from 5 to 50% by weight and a weight ratio of the organic solvent to water [organic solvent/water] of from 0.1 to 0.9; (2) a second step of continuously dispersing the preliminary dispersion by using a media-type dispersing device and continuously separating the resultant dispersion from media particles; and (3) a third step of further dispersing the resultant dispersion by using a homogenizer, as well as [2] a water-based ink for ink-jet printing including the water-based pigment dispersion produced by the process as defined in the above [1].

DETAILED DESCRIPTION OF THE INVENTION

Figure 1:
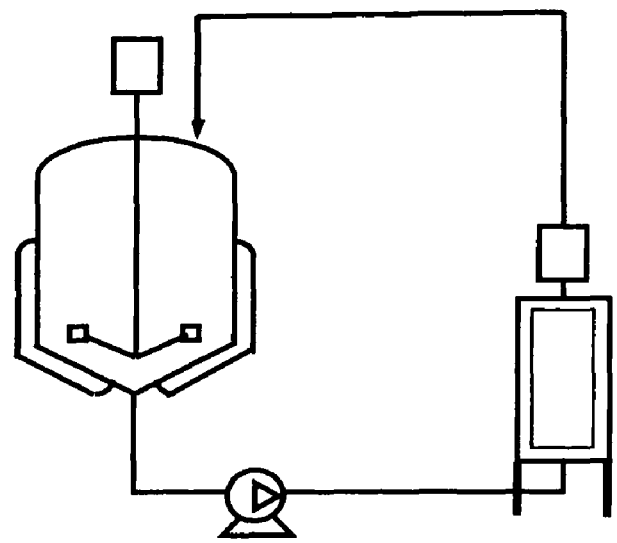
FIG. 1 is a schematic view showing a single tank circulation method used in Examples 1 to 10.

The present invention relates to a process for producing an water-based pigment dispersion containing fine pigment-containing particles stabilized which not only satisfies a high optical density but also exhibits excellent gloss and rubbing resistance when printed on a coated paper, as well as a water-based ink for ink-jet printing.

Thus, the present invention relates the following aspects [1] and [2]:

[1] a process for producing a water-based pigment dispersion which includes:

(1) a first step of mixing (A) an emulsion composition including a water-insoluble polymer having a weight-average molecular weight of from 90,000 to 400,000 and containing a salt-forming group, an organic solvent having a solubility in 100 g of water of from 5 to 40% by weight as measured at 20° C., a neutralizing agent and water, with (B) a pigment to obtain a preliminary dispersion having a content of non-volatile components of from 5 to 50% by weight and a weight ratio of the organic solvent to water [organic solvent/water] of from 0.1 to 0.9;

(2) a second step of continuously dispersing the preliminary dispersion by using a media-type dispersing device and continuously separating the resultant dispersion from media particles; and (3) a third step of further dispersing the resultant dispersion by using a homogenizer, and

[2] a water-based ink for ink-jet printing including the water-based pigment dispersion produced by the process as defined in the above aspect [1].

(Water-Insoluble Polymer)

In the process for producing an water-based pigment dispersion according to the present invention, from the viewpoints of attaining a low viscosity and an excellent ejection property of the resultant inks, a water-insoluble polymer is used therein.

Examples of the water-insoluble polymer include water-insoluble vinyl polymers, water-insoluble ester-based polymers and water-insoluble urethane-based polymers. Among these polymers, in view of a good stability of the water-based dispersion, preferred are the water-insoluble vinyl polymers.

The "water-insoluble polymer" used in the present invention means a polymer exhibiting a solubility in water of 10 g or lower, preferably 5 g or lower and more preferably 1 g or lower when the polymer is dried at 105° C. for 2 h and then dissolved in 100 g of water at 25° C. The solubility means a solubility in water of the water-insoluble polymer whose salt-forming groups, if any, are completely (100%) neutralized with acetic acid or sodium hydroxide according to the kinds of the salt-forming groups to be neutralized.

(Water-Insoluble Graft Polymer)

In view of allowing the resultant dispersions or inks to exhibit a sufficient optical density, the water-insoluble polymer is preferably in the form of a water-insoluble graft polymer containing a main chain that is a polymer chain containing at least a constitutional unit derived from a salt-forming group-containing monomer (a) [hereinafter occasionally referred to merely as a "component (a)"] and a constitutional unit derived from an aromatic ring-containing (meth)acrylate monomer (b) [hereinafter occasionally referred to merely as a "component (b)"], and a side chain that is a polymer chain containing at least a constitutional unit derived from a hydrophobic monomer (e) [hereinafter occasionally referred to merely as a "component (e)"].

In the present invention, the main chain of the water-insoluble graft polymer contains the constitutional unit derived from the component (a) and the constitutional unit derived from the component (b). Therefore, it is considered that the salt-forming group contained therein is enhanced in mobility. As a result, it is suggested that when the water-based dispersion of the pigment-containing water-insoluble graft polymer is injected onto a coated paper (such as a photographic paper and a glossy paper) from ink-jet nozzles, the printed surface of the paper is enhanced in smoothness owing to reduced agglomeration of the salt-forming group, and the resultant characters or images (prints) can also be enhanced in gloss and rubbing resistance.

The constitutional unit derived from the component (a) which is contained in the main chain of the water-insoluble graft polymer is preferably produced by polymerizing the salt-forming group-containing monomer. Alternatively, after producing the polymer, salt-forming groups such as anionic groups and cationic groups may be introduced into the resultant polymer chain. The constitutional unit derived from the component (a) serves for enhancing a dispersion stability of the polymer.

Examples of the preferred salt-forming group-containing monomer as the component (a) include anionic monomers (a-1) and cationic monomers (a-2). Among these monomers, more preferred are the anionic monomers (a-1).

As the anionic monomer (a-1), there may be used at least one compound selected from the group consisting of unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid.

Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconate.

Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, preferred are the unsaturated carboxylic acid monomers in view of good viscosity and ejection property of the resultant inks, and more preferred are acrylic acid and methacrylic acid.

As the cationic monomer (a-2), there may be used unsaturated tertiary amine-containing vinyl monomers and/or unsaturated ammonium salt-containing vinyl monomers.

Examples of the unsaturated tertiary amine-containing vinyl monomers include N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, vinyl pyrrolidone, 2-vinyl pyridine, 4-vinyl pyridine, 2-methyl-6-vinyl pyridine and 5-ethyl-2-vinyl pyridine.

Examples of the unsaturated ammonium salt-containing vinyl monomers include quaternary ammonium compounds derived from N,N-dimethylaminoethyl (meth)acrylate, quaternary ammonium compounds derived from N,N-diethylaminoethyl (meth)acrylate, and quaternary ammonium compounds derived from N,N-dimethylaminopropyl (meth)acrylate.

Among the above cationic monomers, preferred are N,N-dimethylaminoethyl (meth)acrylate, N,N-dimethylaminopropyl (meth)acrylamide and vinyl pyrrolidone.

Meanwhile, the term "(meth)acrylate" used herein means an "acrylate", a "methacrylate" or a mixture thereof.

These salt-forming group-containing monomers may be used alone or in combination of any two or more thereof.

The constitutional unit derived from the component (a) is combined with the constitutional unit derived from the aromatic ring-containing (meth)acrylate monomer (b) to enhance a gloss, a rubbing resistance, etc., of the obtained inks.

Examples of the preferred constitutional unit derived from the component (b) include those constitutional units represented by the following formula (1):

wherein $R^1$ is a hydrogen atom or a methyl group; and $R^2$ is a substituted or unsubstituted arylalkyl group having 7 to 22 carbon atoms, preferably 7 to 18 carbon atoms and more preferably 7 to 12 carbon atoms, or a substituted or unsubstituted aryl group having 6 to 22 carbon atoms, preferably 6 to 18 carbon atoms and more preferably 6 to 12 carbon atoms.

Specific examples of $R^2$ include benzyl group, phenethyl group (phenylethyl group), phenoxyethyl group, diphenylmethyl group and trityl group.

The substituent groups of the arylalkyl group or aryl group may contain hetero atoms. Examples of the hetero atoms include a nitrogen atom, an oxygen atom and a sulfur atom. Specific examples of the substituent groups include alkyl, alkoxy and acyloxy groups preferably having 1 to 9 carbon atoms, hydroxyl group, ether groups, ester groups and nitro group.

The constitutional unit represented by the formula (1) is preferably produced by polymerizing a monomer represented by the following formula (1-1):

$$CH_2=CR^1COOR^2 \quad (1\text{-}1)$$

wherein $R^1$ and $R^2$ are the same as defined above.

Specific examples of the monomer represented by the formula (I-1) include benzyl(meth)acrylate, phenyl(meth)acrylate, 2-phenylethyl(meth)acrylate, phenoxyethyl(meth)acrylate, 1-naphthalyl acrylate, 2-naphthalyl(meth)acrylate, phthalimidemethyl(meth)acrylate, p-nitrophenyl(meth)acrylate, 2-hydroxy-3-phenoxypropyl(meth)acrylate, 2-methacryloyloxyethyl-2-hydroxypropyl phthalate and 2-acryloyloxyethyl phthalate. Among these monomers, preferred is benzyl(meth)acrylate. These monomers may be used alone or in combination of any two or more thereof.

To enhance a storage stability, an optical density, etc., of the resultant inks, the main chain of the water-insoluble graft polymer may also contain a constitutional unit derived from a (meth)acrylate (c-1) containing an alkyl group having 1 to 22 carbon atoms [hereinafter occasionally referred to merely as a "component (c-1)"], or a monomer (c-2) represented by the following formula (2) [hereinafter referred to merely a "component (c-2)"] [the components (c-1) and (c-2) are hereinafter totally referred to merely as a "component (c)"]:

$$CH_2=C(R^3)-R^4 \quad (2)$$

wherein $R^3$ is a hydrogen atom or an alkyl group having 1 to 5 carbon atoms; and $R^4$ is an aromatic ring-containing hydrocarbon group having 6 to 22 carbon atoms.

More specifically, the constitutional unit derived from a (meth)acrylate containing an alkyl group having 1 to 22 carbon atoms may be produced by polymerizing a monomer such as methyl(meth)acrylate, ethyl(meth)acrylate, (iso)propyl(meth)acrylate, (iso- or tertiary-)butyl(meth)acrylate, 2-ethylhexyl(meth)acrylate, (iso)octyl(meth)acrylate, (iso)decyl(meth)acrylate, (iso)dodecyl(meth)acrylate, (iso)stearyl(meth)acrylate and behenyl(meth)acrylate.

Meanwhile, the terms "(iso- or tertiary-)" and "(iso)" used herein mean both branched structures represented by "iso" and "tertiary", and unbranched structure (i.e., "normal").

In the formula (2), $R^3$ is preferably a hydrogen atom or a methyl group. As the monomer represented by the formula (2), in view of a good optical density, there is preferably used at least one compound selected from the group consisting of styrene, vinyl naphthalene, α-methyl styrene, vinyl toluene, ethyl vinyl benzene, 4-vinyl biphenyl and 1,1-diphenyl ethylene. Among these compounds, in view of good optical density and storage stability of the resultant inks, preferred is at least one styrene-based monomer selected from the group consisting of styrene, α-methyl styrene and vinyl toluene.

The main chain preferably further contains a constitutional unit derived from a nonionic (meth)acrylate-based monomer (d) [hereinafter occasionally referred to merely as a "component (d)"] in view of enhancing a gloss, an optical density and an ejection stability of the resultant inks.

The nonionic (meth)acrylate-based monomer (d) is preferably a nonionic monomer represented by the following formula (3):

$$CH_2=C(R^5)COO(R^6O)_nR^7 \quad (3)$$

wherein $R^5$ is a hydrogen atom or an alkyl group having 1 to 3 carbon atoms; $R^6$ is an alkylene group having 2 to 18 carbon atoms; n represents an average molar number of addition and is a number of 1 to 30; and $R^7$ is a hydrogen atom, an alkyl group having 1 to 18 carbon atoms or a phenyl group which may be substituted with an alkyl group having 1 to 8 carbon atoms.

In the formula (3), in view of polymerizability, etc., $R^5$ is preferably a hydrogen atom or a methyl group, and $R^6$ is preferably an alkylene group having 2 to 4 carbon atoms such as an ethylene group, a trimethylene group, a propane-1,2-diyl group or a tetramethylene group. More specifically, as $R^6$, an ethylene group is preferred in view of enhancing an ejection property and a gloss of the resultant inks, and a trimethylene group, a propane-1,2-diyl group and or a tetramethylene group are preferred in view of enhancing an optical density of the inks. The suffix n is preferably a number of 2 to 25 and more preferably 4 to 23 in view of good optical density and storage stability of the resultant inks. If the suffix n is 2 or more, at least two of a plurality of $R^6$ groups may be the same or different. If the $R^6$ groups are different from each other, the $R^6$ groups may be bonded to each other in any manner of block addition and random addition.

In view of a high optical density and a good storage stability of the resultant inks, $R^7$ is preferably an alkyl group having 1 to 12 carbon atoms and more preferably an alkyl group having 1 to 8 carbon atoms, or preferably a phenyl group which may be substituted with an alkyl group having 1 to 8 carbon atoms.

Examples of the alkyl group having 1 to 8 carbon atoms include methyl, ethyl, propyl, isopropyl, butyl, tert-butyl, hexyl, octyl and 2-ethylhexyl groups.

Specific examples of the nonionic monomer represented by the formula (3) include hydroxyethyl methacrylate, methoxy polyethylene glycol mono(meth)acrylate, polyethylene glycol mono(meth)acrylate, methoxy polypropylene glycol mono(meth)acrylate, polypropylene glycol mono(meth)acrylate, ethylene glycol/propylene glycol(meth)acrylate, poly(ethylene glycol/propylene glycol)mono(meth)acrylate and octoxy-polyethylene glycol/polypropylene glycol mono(meth)acrylate. These nonionic monomers may be used alone or in combination of any two or more thereof.

The weight ratio of the constitutional unit derived from the salt-forming group-containing monomer (a) (calculated as a non-neutralized monomer; this is similarly applied to the subsequent descriptions) to the constitutional unit derived from the aromatic ring-containing (meth)acrylate monomer (b) [content of constitutional unit derived from the component (a)/content of constitutional unit derived from the component (b)] in the main chain is preferably from 1/1 to 1/20, more preferably from 1/1.5 to 1/15 and still more preferably from 1/2 to 1/10 in view of enhancing a gloss and a rubbing resistance of the characters or images printed. When the weight ratio [(a)/(b)] lies within the above-specified range, the coated paper printed with the resultant ink exhibits an excellent gloss.

The respective contents of the constitutional units derived from the components (a) to (d) in the main chain of the water-insoluble graft polymer used in the present invention are as follows.

The content of the constitutional unit derived from the component (a) is preferably from 3 to 30% by weight, more preferably from 5 to 20% by weight and still more preferably from 5 to 15% by weight in view of enhancing a dispersibility of the water-insoluble graft polymer.

The content of the constitutional unit derived from the component (b) is preferably from 10 to 80% by weight, more preferably from 15 to 75% by weight and still more preferably from 20 to 70% by weight in view of enhancing a gloss and a rubbing resistance of the resultant inks.

The content of the constitutional unit derived from the component (c-1) is preferably from 0 to 30% by weight and more preferably from 0 to 15% by weight in view of enhancing a dispersion stability of the resultant inks. The content of the constitutional unit derived from the component (c-2) is preferably from 0 to 30% by weight and more preferably from 0 to 15% by weight in view of enhancing an optical density and a high lighter fastness of the resultant inks. Also, the content of the constitutional unit derived from the component (c) is preferably from 0 to 40% by weight and more preferably from 0 to 20% by weight in view of enhancing a dispersion stability and an optical density of the resultant inks.

The content of the constitutional unit derived from the component (d) is preferably from 0 to 60% by weight and more preferably from 10 to 50% by weight in view of enhancing an optical density, a gloss and an ejection stability of the resultant inks.

The water-insoluble graft polymer used in the present invention contains the constitutional unit derived from a hydrophobic monomer (e) in a side chain thereof in view of allowing the colorant to be sufficiently included in particles of the water-insoluble graft polymer, and enhancing an optical density of the resultant inks.

The content of the constitutional unit derived from the component (e) in the side chain is preferably 60% by weight or more, more preferably 70% by weight or more and still more preferably 90% by weight or more in view of allowing the colorant to be sufficiently included in particles of the water-insoluble graft polymer, and enhancing an optical density of the resultant inks.

Examples of the hydrophobic monomer (e) include vinyl-based monomers. Among the vinyl-based monomers, in particular, preferred are styrene-based monomers. Examples of the styrene-based monomers include styrene, α-methyl styrene and vinyl toluene. Among these styrene-based monomers, preferred is styrene. The side chain containing the constitutional unit derived from the styrene-based monomer may be produced by copolymerizing a styrene-based macromer having a polymerizable functional group at one terminal end thereof (hereinafter referred to merely as "styrene-based macromer").

Examples of the styrene-based macromer include styrene homopolymers having a polymerizable functional group at one terminal end thereof, and copolymers of styrene with other monomers which have a polymerizable functional group at one terminal end thereof. The polymerizable functional group bonded to one terminal end of the styrene-based macromer is preferably an acryloyloxy group or a methacryloyloxy group. Examples of the other monomers copolymerizable with styrene include (meth)acrylates, aromatic ring-containing (meth)acrylates and acrylonitrile.

In the side chain or the styrene-based macromer, the constitutional unit derived from the styrene-based monomer has a largest content. Specifically, in view of incorporating a sufficient amount of the colorant into the water-insoluble graft polymer and enhancing the optical density, the content of the constitutional unit derived from the styrene-based monomer in the side chain or the styrene-based macromer is preferably 60% by weight or more, more preferably 70% by weight or more and still more preferably 90% by weight or more.

The number-average molecular weight of the styrene-based macromer is preferably in the range of from 1000 to 10000 and more preferably 2000 to 8000 in view of controlling a viscosity thereof to a low level while increasing a copolymerization ratio thereof to enhance a storage stability of the resultant inks.

The number-average molecular weight of the styrene-based macromer may be measured by gel permeation chromatography using polystyrene as a standard substance and using tetrahydrofuran containing 50 mmol/L of acetic acid as a solvent.

The styrene-based macromer is commercially available, for example, from Toagosei Co., Ltd., as product names of AS-6, AS-6S, AN-6, AN-6S, HS-6, HS-6S, etc.

The weight ratio of the main chain containing the constitutional unit derived from the salt-forming group-containing monomer (a) and the constitutional unit derived from the aromatic ring-containing (meth)acrylate monomer (b), to the side chain containing the constitutional unit derived from the hydrophobic monomer (e) [main chain/side chain] in the water-insoluble graft polymer used in the present invention is from 1/1 to 20/1, more preferably from 3/2 to 15/1 and still more preferably from 2/1 to 10/1 (calculated assuming that the polymerizable functional group is contained in the side chain; this is similarly applied to the subsequent descriptions) in view of enhancing an optical density, a gloss and a rubbing resistance of the resultant inks.

The water-insoluble graft polymer used in the present invention may further contain side chains composed of other constitutional units, for example, an organopolysiloxane side chain. Such a side chain is preferably produced, for example, by copolymerizing a silicone-based macromer having a polymerizable functional group at one terminal end thereof which is represented by the following formula (4):

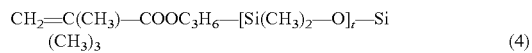

$$CH_2=C(CH_3)—COOC_3H_6—[Si(CH_3)_2—O]_t—Si(CH_3)_3 \quad (4)$$

wherein t is a number of 8 to 40.

The water-insoluble graft polymer used in the present invention may be produced by copolymerizing a monomer mixture containing the salt-forming group-containing monomer (a), the aromatic ring-containing (meth)acrylate monomer (b) and the hydrophobic monomer (e) such as styrene-based macromers, and preferably by copolymerizing the above monomer mixture with a monomer mixture containing the monomer component (c) and/or the nonionic (meth)acrylate-based monomer (d) (hereinafter, these mixtures are each generally referred to as a "monomer mixture").

The respective contents of the components (a) to (e) in the monomer mixture, or the respective contents of the constitutional units derived from the components (a) to (e) in the main chain or side chain of the water-insoluble graft polymer, are as follows.

The content of the salt-forming group-containing monomer (a) in the monomer mixture (content of non-neutralized monomer; this is similarly applied to the subsequent descriptions) or the content of the constitutional unit derived from the component (a) in the main chain of the water-insoluble graft polymer is preferably from 3 to 30% by weight, more preferably from 3 to 20% by weight and still more preferably from 5 to 15% by weight in view of enhancing a dispersion stability of the resultant dispersion, a gloss of the resultant prints, etc.

The content of the component (b) in the monomer mixture or the content of the constitutional unit derived from the component (b) in the main chain of the water-insoluble graft polymer is preferably from 10 to 80% by weight, more preferably from 15 to 70% by weight and still more preferably from 20 to 60% by weight in view of enhancing a gloss and a rubbing resistance of the resultant prints, etc.

The content of the component (c) in the monomer mixture, or the content of the constitutional unit derived from the component (c) in the water-insoluble graft polymer is preferably from 0 to 40% by weight and more preferably from 0 to 20% by weight in view of a good optical density, a good dispersion stability, a high lighter fastness, etc., of the resultant inks The content of the component (d) in the monomer mixture, or the content of the constitutional unit derived from the component (d) in the water-insoluble graft polymer is preferably from 0 to 60% by weight and more preferably from 10 to 50% by weight in view of good ejection stability, gloss and optical density of the resultant inks.

The content of the component (e) in the monomer mixture or the content of the constitutional unit derived from the component (e) in the side chain of the water-insoluble graft polymer is preferably from 5 to 50% by weight, more preferably from 5 to 40% by weight and still more preferably from 5 to 35% by weight in view of enhancing an optical density of the resultant prints, etc.

The weight ratio of the component (a) to the component (e) [content of component (a)/content of component (e)] in the monomer mixture, or the weight ratio of the constitutional unit derived from the component (a) to the constitutional unit derived from the component (e) [content of constitutional unit derived from the component (a)/content of constitutional unit derived from the component (e)] in the water-insoluble graft polymer, is preferably from 1/5 to 2/1 and more preferably from 1/4 to 2/1 in view of good dispersion stability and optical density of the resultant inks The weight ratio of the component (b) to the component (d) [content of component (b)/content of component (d)] in the monomer mixture, or the weight ratio of the constitutional unit derived from the component (b) to the constitutional unit derived from the component (d) [content of constitutional unit derived from the component (b)/content of constitutional unit derived from the component (d)] in the water-insoluble graft polymer, is preferably from 5/1 to 1/2 and more preferably from 4/1 to 1/2 in view of good gloss and optical density of the resultant inks.

In the water-insoluble graft polymer used in the present invention, the salt-forming group of the salt-forming group-containing monomer contained therein is neutralized with the below-mentioned neutralizing agent. The degree of neutralization of the salt-forming group is preferably from 10 to 200%, more preferably from 20 to 150% and still more preferably from 30 to 100%. In addition, even if the salt-forming group is excessively neutralized upon the preliminary dispersion procedure, when using such a neutralizing agent capable of being removed in the subsequent concentration process, the degree of neutralization thereof may be appropriately adjusted.

When the salt-forming group is an anionic group, the degree of neutralization is calculated according to the following formula:

$$\{[\text{weight (g) of neutralizing agent}]/\text{equivalent of neutralizing agent}]/[\text{acid value of polymer (KOH mg/g)} \times \text{weight (g) of polymer}/(56 \times 1000)]\} \times 100.$$

When the salt-forming group is a cationic group, the degree of neutralization is calculated according to the following formula:

$$\{[\text{weight (g) of neutralizing agent}]/\text{equivalent of neutralizing agent}]/[\text{amine value of polymer (HCl mg/g)} \times \text{weight (g) of polymer}/(36.5 \times 1000)]\} \times 100.$$

The acid value or amine value of the polymer may be calculated from the respective constitutional units of the water-insoluble graft polymer, or may also be determined by the method of subjecting a solution prepared by dissolving the polymer in an appropriate solvent such as methyl ethyl ketone to titration.

The acid value of the polymer is preferably 30 (KOH mg/g) or more and more preferably 40 (KOH mg/g) or more in view of a good dispersion stability thereof, and also preferably 200 (KOH mg/g) or less and more preferably 150 (KOH mg/g) or less in view of exhibiting a high optical density of the resultant inks.

(Production of Water-Insoluble Graft Polymer)

The water-insoluble graft polymer used in the present invention may be produced by copolymerizing the monomer mixture by known methods such as bulk polymerization, solution polymerization, suspension polymerization and emulsion polymerization. Among these polymerization methods, preferred is the solution polymerization.

The solvent for the solution polymerization method is preferably an organic polar solvent. The organic polar solvent miscible with water may be used in the form of a mixture with water.

Examples of the organic polar solvents include aliphatic alcohols having 1 to 3 carbon atoms such as methanol, ethanol and propanol; ketones such as acetone, methyl ethyl ketone and methyl isobutyl ketone; and esters such as ethyl acetate. Among these solvents, preferred are methanol, ethanol, acetone, methyl ethyl ketone and mixed solvents of at least one thereof with water.

The polymerization conditions of the monomer mixture vary depending upon the kinds of radical polymerization initiator, monomers, solvent, etc., to be used, and therefore are not particularly limited. The polymerization is generally conducted at a temperature of preferably from 30 to 100° C. and preferably from 50 to 80° C. The polymerization time is preferably from 1 to 20 h. The polymerization is preferably conducted in an atmosphere of an inert gas such as nitrogen and argon.

After completion of the polymerization reaction, the water-insoluble graft polymer thus produced is isolated from the reaction solution by a known method such as reprecipitation and removal of solvent by distillation. The thus obtained water-insoluble graft polymer may be further purified by repeated reprecipitation, membrane separation, chromatography, extraction, etc., for removing unreacted monomers, etc., therefrom.

The weight-average molecular weight of the water-insoluble graft polymer thus produced is preferably from 90,000 to 400,000 and more preferably from 120,000 to 350,000 in view of a good dispersion stability of the pigment as well as a good water resistance and a good ejection property of the resultant inks.

Meanwhile, the weight-average molecular weight of the water-insoluble graft polymer may be measured by gel permeation chromatography using dimethylformamide in which 60 mmol/L of phosphoric acid and 50 mmol/L of lithium bromide are dissolved, as a solvent, and using polystyrene as a standard substance.

(Organic Solvent)

The organic solvents used in the present invention have a solubility in 100 g of water of from 5 to 40% by weight and preferably from 10 to 30% by weight as measured at 20° C.

When using the above organic solvents, the resultant water-based pigment dispersion can be improved in dispersion stability of the pigment therein. The reason for the improved dispersion stability of the pigment is considered as follows. That is, when the emulsion composition and the pigment are mixed in the organic solvent partially dissolved in water, the surface of the pigment is wetted with the organic solvent dissolved in water, so that adsorption of the water-insoluble graft polymer onto the surface of the pigment can be enhanced.

Examples of the organic solvents include alcohol solvents, ketone solvents, ether solvents, aromatic hydrocarbon solvents, aliphatic hydrocarbon solvents and halogenated aliphatic hydrocarbon solvents. Examples of the alcohol solvents include 1-butanol (solubility in 100 g of water at 20° C.: 7.8% by weight; refer to ASAHARA, Shozo, "HANDBOOK FOR SOLVENTS", Kodan-sha, published in 1976; this is similarly applied to descriptions of this paragraph) and 2-butanol (solubility in 100 g of water at 20° C.: 12.5% by weight). Examples of the ketone solvents include methyl ethyl ketone (solubility in 100 g of water at 20° C.: 22.6% by weight). Among these organic solvents, methyl ethyl ketone is preferably used in view of a good safety and a facilitated operation for removal thereof in post treatments. These organic solvents may be used alone or in the form of a mixture of any two or more thereof.

(Neutralizing Agent)

As the neutralizing agent, acids or bases may be used according to the kind of the salt-forming group in the water-insoluble graft polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine and triethanolamine.

(Emulsion Composition (A))

The emulsion composition (A) used in the present invention contains a water-insoluble polymer such as a water-insoluble graft polymer, an organic solvent, a neutralizing agent and water.

The amount of the water-insoluble polymer used is preferably from 0.1 to 160 parts by weight, more preferably from 0.5 to 100 parts by weight and still more preferably from 1 to 50 parts by weight on the basis of 100 parts by weight of water in view of a good stability of the emulsion composition. The content of the water-insoluble polymer in the emulsion composition is preferably from 1 to 20% by weight in view of a good stability of the emulsion composition.

The content of water in the emulsion composition is preferably from 20 to 90% by weight and more preferably from 30 to 80% by weight in view of a good stability of the emulsion composition as well as a good compatibility with the pigment.

The content of the neutralizing agent in the emulsion composition may be appropriately controlled such that the finally obtained water-based pigment dispersion exhibits a neutral liquid property, for example, a pH of 4.5 to 10. For example, when the salt-forming group of the water-insoluble polymer is an anionic group, the content of the neutralizing agent in the emulsion composition may be controlled such that the pH of the water-based pigment dispersion lies in the range of from 7 to 10.

The method for mixing the respective components to produce the emulsion composition is not particularly limited. The method of dissolving or dispersing the water-insoluble polymer in the organic solvent and then mixing water and the neutralizing agent with the resultant solution or dispersion is preferred, since a part of the water-insoluble polymer is dissolved in the organic solvent to thereby produce a uniform emulsion composition. The temperature used upon mixing the respective components is not particularly limited, and is preferably from 5 to 50° C.

The emulsion composition obtained by mixing the respective components is in the form of a composition of an oil-in-water type containing water as a continuous phase.

(Pigment (B))

The pigment (B) may be either organic or inorganic. The organic or inorganic pigment may be used in combination with an extender pigment, if required.

Examples of the organic pigments include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the organic pigments is not particularly limited. In the present invention, there may be used chromatic color pigments such as red-color organic pigments, yellow-color organic pigments, blue-color organic pigments, orange-color organic pigments and greenish orange-color organic pigments.

Specific examples of the preferred organic pigments include one or more pigments selected from the group consisting of C.I. Pigment Yellow 13, 17, 74, 83, 97, 109, 110, 120, 128, 139, 151, 154, 155, 174, 180; C.I. Pigment Red 48, 57:1, 122, 146, 176, 184, 185, 188, 202; C.I. Pigment Violet 19, 23; C.I. Pigment Blue 15, 15:1, 15:2, 15:3, 15:4, 16, 60; and C.I. Pigment Green 7, 36, with various product numbers.

Examples of the inorganic pigments include carbon blacks, metal oxides, metal sulfides and metal chlorides. In particular, among these inorganic pigments, carbon blacks are preferably used for black water-based inks. The carbon blacks may include furnace blacks, thermal lamp blacks, acetylene blacks and channel blacks.

Examples of the extender pigment include silica, calcium carbonate and talc.

The pigment may also be a so-called self-dispersible pigment. The "self-dispersible pigment" means a pigment onto a surface of which at least one anionic or cationic hydrophilic group is bonded either directly or through the other atom group to thereby allow the pigment to be dispersed in an aqueous medium without using a surfactant or a resin. The anionic hydrophilic group is preferably a carboxyl group ($-COOM^1$) or a sulfonic group ($-SO_3M^1$) wherein $M^1$ is a hydrogen atom, an alkali metal or ammonium. The cationic hydrophilic group is preferably a quaternary ammonium group.

In order to render ordinary pigments self-dispersible, a necessary amount of the anionic hydrophilic group or the cationic hydrophilic group may be chemically bonded to the surface of the pigments by known methods, for example, the method of introducing a carboxyl group into the pigments using a suitable acid; the method of introducing a sulfone group into the pigments by thermal decomposition of persulfate compounds; or the method of introducing the above anionic hydrophilic group into the pigments using diazonium salt compounds containing a carboxyl group, a sulfone group or an amino group.

These pigments may be used alone or in the form of a mixture of any two or more thereof.

The amount of the pigment used in the emulsion composition is preferably from 1 to 90 parts by weight, more preferably from 5 to 80 parts by weight and still more preferably from 10 to 70 parts by weight on the basis of 100 parts by weight of the emulsion composition in view of attaining a good optical density and allowing the pigment to be included in the water-insoluble graft polymer. Also, the ratio between the amounts of the water-insoluble graft polymer and the pigment may be controlled such that the pigment is preferably used in an amount of from 20 to 1,000 parts by weight, more preferably from 50 to 900 parts by weight and still more preferably from 100 to 800 parts by weight on the basis of 100 parts by weight of the solid content of the water-insoluble graft polymer, in view of enhancing an optical density of the resultant inks.

(Production of Water-Based Pigment Dispersion)

The process for producing the water-based pigment dispersion includes (1) a first step of mixing the emulsion composition (A) and the pigment (B) with each other to prepare a preliminary dispersion; (2) a second step of continuously dispersing the thus prepared preliminary dispersion using a media-type dispersing device while continuously separating the resultant dispersion from the media particles; and (3) a third step of further dispersing the resultant dispersion using a homogenizer.

(First Step)

In the first step, a mixture obtained by mixing the emulsion composition (A) and the pigment (B) with each other (hereinafter referred to merely as a "mixture") is subjected to dispersing treatment in order to obtain a preliminary dispersion in which the pigment is uniformly dispersed in the emulsion composition, and allow the neutralized water-insoluble polymer to adsorb onto the pigment.

The order of mixing of the emulsion composition (A) and the pigment (B) is not particularly limited. From the viewpoints of enhanced productivity in view of bulk specific gravity of the pigment as well as facilitated mixing of the emulsion composition and the pigment, it is preferred that the pigment (B) is added to the emulsion composition (A).

On the other hand, for example, without using the emulsion composition (A), when the pigment is mixed in the organic solvent in which the water-insoluble polymer is dissolved, the pigment fails to be uniformly dispersed in the organic solvent solution. Even though water is subsequently added to the mixture, it is difficult to prepare an emulsion composition in which the pigment is uniformly dispersed. In addition, even when previously mixing water and the pigment with each other and then adding the organic solvent in which the water-insoluble polymer is dissolved, to the resultant mixture, it is also difficult to prepare an emulsion composition in which the pigment is uniformly dispersed.

Upon dispersing the mixture of the emulsion composition and the pigment, from the viewpoints of enhancing a dispersion force and a shear force applied thereto to reduce a particle size of the pigment and, therefore, enhancing a productivity of the aimed dispersion, the content of non-volatile components in the mixture is preferably adjusted to 5% by weight or more, more preferably 8% by weight or more and still more preferably 10% by weight or more. Also, from the viewpoints of reduction in viscosity of the mixture for obtaining a uniform preliminary dispersion as well as facilitated separation of the media particles from the dispersion, the content of non-volatile components in the mixture is preferably adjusted to 50% by weight or less, more preferably 40% by weight or less and still more preferably 35% by weight or less. From these viewpoints, the content of non-volatile components in the mixture is preferably from 5 to 50% by weight, more preferably from 8 to 40% by weight and still more preferably from 10 to 35% by weight.

The "content of non-volatile components" used herein means the value calculated according to the following formula:

Content of non-volatile components (wt %)=[(total weight of salt-forming group-containing water-insoluble polymer, neutralizing agent and pigment)/(total weight of emulsion composition and pigment)]×100

As the weight ratio of the organic solvent to water [organic solvent/water] upon dispersing the mixture decreases, the amount of the organic solvent dissolved in water is comparatively reduced, resulting in such a tendency that the surface of the pigment is hardly wetted to a sufficient extent. Therefore, the weight ratio of the organic solvent to water [organic solvent/water] is 0.1 or more and preferably 0.2 or more.

On the contrary, when the weight ratio of the organic solvent to water [organic solvent/water] increases, the surface of the pigment will be sufficiently wetted. However, there occurs such a tendency that the viscosity of the mixture is raised, uniform mixing and dispersing of the mixture is difficult, and the emulsion composition of an oil-in-water type is converted into that of a water-in-oil type. Therefore, from the viewpoints of reducing the viscosity of the mixture to such an extent that the mixture can be uniformly dispersed, and preventing conversion of the emulsion composition of an oil-in-water type into that of a water-in-oil type, the weight ratio of the organic solvent to water [organic solvent/water] is 0.9 or less. Further, since the viscosity of the mixture also tends to be increased when enhancing the content of the non-volatile components, the weight ratio of the organic solvent to water [organic solvent/water] is preferably 0.8 or less. From these viewpoints, the weight ratio of the organic solvent to water [organic solvent/water] is from 0.1 to 0.9 and preferably from 0.2 to 0.8.

In addition, upon dispersing the mixture, in order to reduce the content of coarse particles in the dispersion obtained after the first step and enhance absorptivity of the water-insoluble polymer to the pigment, the mixture may be preliminarily dispersed two or more times while stepwise reducing the weight ratio of the organic solvent to water [organic solvent/water] and the content of the non-volatile components. The frequency of the repeated treatments for preliminarily dispersing the mixture is preferably 10 or less times and more preferably 5 or less times from the viewpoints of a less complicated procedure and a good productivity.

In the first step, there may be used ordinary mixing or stirring devices such as anchor blades. Examples of the preferred mixing or stirring devices include high-speed mixers or stirrers such as "Ultra Disper"™ available from Asada Tekko Co., Ltd., "Ebara Milder"™ available from EBARA Corp., "TK Homomixer", "TK Pipeline Mixer", "TK Homo Jetter", "TK Homomic Line Flow" and "Filmix"™ all available from PRIMIX Corp., "Clearmix"™ available from M-Technic Co., Ltd., and "K.D. Mill"™ available from Kinetics Dispersion Inc.

Meanwhile, when the preliminary dispersion obtained after preliminarily dispersing the mixture in the first step contains a large amount of coarse particles, a strong shear force greater than the stirring force may be applied to the preliminary dispersion, if required, to finely pulverize the coarse particles into a desired particle size, or the coarse particles may be removed from the dispersion using a centrifugal separator. In view of the production process, there may be used, for example, the method of continuously conducting the dispersing treatment and centrifugal separation treatment during delivery of the dispersion from the first step to the second step, the method of delivering the dispersion to the second step while continuously dispersing the dispersion using a high-pressure homogenizer having a high pulverization effect, etc.

(Second Step)

The second step is conducted for the purpose of continuously dispersing the preliminary dispersion obtained in the first step using a media-type dispersing device to further pulverize the pigment. Further, in the second step, the resultant dispersion is continuously separated from the media particles.

In the media-type dispersing device used in the second step, there are employed the media particles (minute beads). The dispersing device of this type is suitable for applying a shear force, an impingement force and a pulverization force capable of finely dividing the pigment into near primary particles thereof.

In the media-type dispersing device, the preliminary dispersion is passed through a dispersion chamber (mill) in which the media particles are retained, and dispersed while applying a dispersion energy owing to pulverization, shearing and impingement caused by the media particles to the preliminary dispersion, and at the same time, the media particles and the resultant dispersion are separated by centrifugal separation, etc., from each other. Finally, only the resultant dispersion is discharged out of the dispersion chamber.

Examples of the media-type dispersing device include known dispersing devices such as "Star Mill"™ available from Ashizawa Fine-Tec Co., Ltd., "Ultra Apex Mill"™ available from Kotobuki Industries Co., Ltd., "Pico Mill"™ available from Asada Tekko Co., Ltd., "DCP Super Flow, Cosmo"™ Nippon Einrich Co., Ltd., and "MSC Mill"™ available from Mitsui Mining Co., Ltd.

A typical media-type dispersing device has, for example, such a structure in which a plurality of agitator discs (rotor) mounted on a drive shaft are disposed within a cylindrical dispersion chamber having a liquid feed port, and a number of media particles are accommodated within an inner space thereof. While rotating the agitator discs by rotating the drive shat, a mixed solution (slurry) containing the emulsion composition (A) composed of the salt-forming group-containing water-insoluble polymer, the organic solvent, the neutralizing agent and water, and the pigment (B), is continuously introduced into the dispersion chamber through the liquid feed port, and a strong shear force is applied to the media particles and the mixed solution, so that the pigment (B) is pulverized in the mixed solution and finely dispersed therein. The resultant mixed solution in which the pigment (B) is finely dispersed, is separated from the media particles, and then discharged to outside through a liquid discharge port provided at an upper portion of the dispersion chamber.

As the method of separating the mixed solution from the media particles, there may be used a centrifugal separation method or combination of a screening method and a centrifugal separation method.

Figure 2:
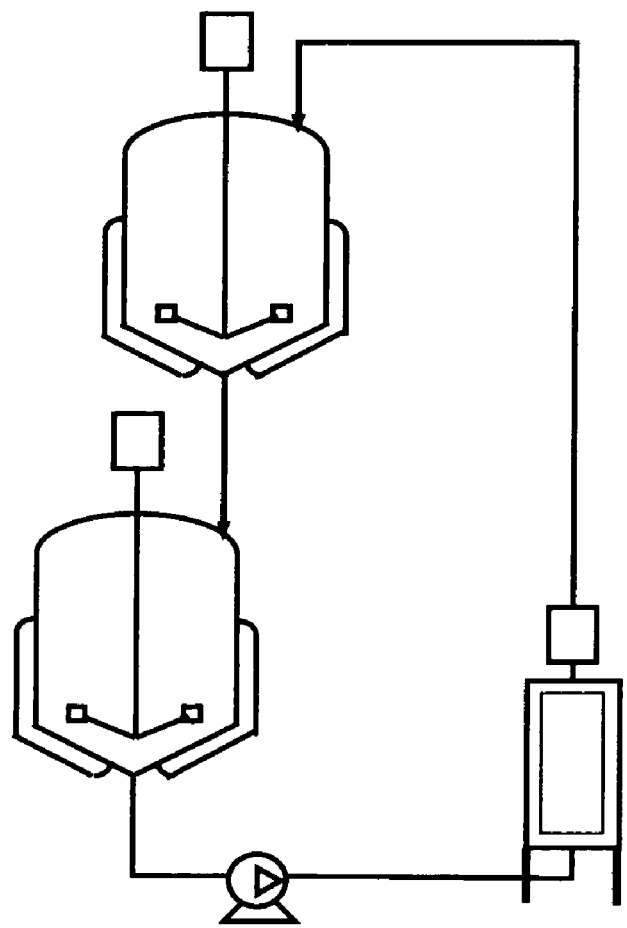
FIG. 2 is a schematic view showing a twin tank liquid feedback method used in Example 11.

The operating method capable of conducting the dispersion process and the separation process at the same time and in a continuous manner includes a circulation method and a continuous method. In the circulation method, for example, by disposing a single tank and the media-type dispersing device and connecting them together through conduits to form a circulation system, the dispersion is circulated and passed through the circulation system (single tank circulation method; refer to FIG. 1). Also, in the continuous method, there may be used the method of disposing two tanks and the media-type dispersing device and passing the dispersion therethrough in a catch-ball manner; the method of allowing the dispersion to pass through the media-type dispersing device between the two tanks one time and then returning the thus treated dispersion back to the original tank, and repeating the similar passing procedure plural times (twin tank liquid feedback method; refer to FIG. 2); the method of passing the dispersion through a necessary number of the media-type dispersing devices arranged in series one time. Among these methods, preferred is the continuous method, since distribution of frequency of passes is hardly caused when allowing the dispersion to flow and pass through the media-type dispersing device. Meanwhile, in the case where a plurality of the media-type dispersing devices are arranged in series, since the liquid temperature after the dispersion treatment is raised, it is preferred that a cooler is disposed at an outlet of a series of the dispersing devices.

Examples of the material of the media particles used in the media-type dispersing device include high-hardness metals such as steel and chromium alloys; high-hardness ceramic materials such as alumina, zirconia, zircon and titania; glass; and polymer materials such as ultrahigh molecular weight polyethylene and nylon.

The magnitude of the shear force, impingement force or pulverization force applied for finely dividing the pigment is increased with increase in specific gravity of the media particles used. For this reason, it is preferred to use ceramic media particles having a relatively large specific gravity, and it is more preferred to use media particles made of zirconia or titania in view of a good abrasion resistance. In addition, from the viewpoint of reducing an amount of contaminants generated from the media particles, there may be used such media particles as produced by a high frequency induction heating plasma method.

The media particles used in the above media-type dispersing device have a desired particle size (diameter). However, the amount of contaminants generated from the media particles can be reduced and further the time required for pulverization of the pigment can be shortened as the particle size of the media particles is decreased. Therefore, the particle size of the media particles is preferably 0.25 mm or less and more preferably 0.20 mm or less. Further, from the viewpoint of facilitated separation of the media particles from the pigment dispersion, the particle size of the media particles is preferably 0.01 mm or more and more preferably 0.03 mm or more.

The peripheral speed of the agitator discs (rotor) of the media-type dispersing device at a tip end thereof is not particularly limited, and is preferably 4 m/s or more and more preferably 6 m/s or more. When the peripheral speed of the agitator discs is 4 m/s or more, the mixing and dispersing condition within the dispersion chamber can be kept in a good condition, and a centrifugal force required for separating the resultant dispersion from the media particles can be readily attained.

An apparent filling rate of the media particles in the dispersion chamber of the media-type dispersing device is preferably in the range of from 50 to 100% by volume on the basis of an inner volume of the dispersion chamber. When the apparent filling rate of the media particles is less than 50% by volume, the effects of pulverization, shearing and impingement caused by the media particles tend to be lowered, resulting in poor dispersing effect of the pigment.

The operating procedure for dispersing the pigment may be conducted by appropriately selecting various conditions for the above circulation method or the continuous method such as kinds of the media-type dispersing device and media particles used, particle size of the media particles, peripheral speed of the rotor and filling rate of the media particles. The net power of the dispersing device applied per 1 kg of the preliminary dispersion obtained in the first step is preferably from 0.3 to 4 [kw/kg] and more preferably from 0.3 to 3 [kw/kg] so as to avoid such a problem that the energy required for the dispersing procedure is too small and, on the contrary, excessive. Further, the dispersing procedure is suitably performed under such a condition that the cumulative net power lies within the range of preferably from 0.1 to 2 [kwh/kg], more preferably from 0.1 to 1.5 [kwh/kg] and still more preferably from 0.2 to 1.5 [kwh/kg]. The "net power" used herein means a power calculated by subtracting an idling power of the dispersing device from an actual loaded power thereof, and the "idling power" means a power under the condition in which neither the media particles nor the dispersing medium are present. Further, the "cumulative net power" means the value obtained by multiplying the net power [kw/kg] by a treating time [h].

Also, the method of applying the dispersing energy to the dispersion should be taken into consideration. From the viewpoint of controlling a flow rate of the dispersion treated to an adequate range and preventing undesirable change in particle size of particles dispersed in the pigment dispersion as well as undesirable change in viscosity of the pigment dispersion owing to heat generated, the average retention time per one pass through the dispersing chamber is preferably in the range of from 30 s to 10 min. The total average retention time obtained by multiplying the average retention time by the number of passes is preferably in the range of from 5 min to 100 min although it varies depending upon a capacity or a size of the dispersing device used. The "average retention time" used herein means the value obtained by dividing a space volume [L] of the dispersing chamber except for a volume of the media particles by the flow rate [L/h] of the dispersion treated.

The temperature used upon the dispersing treatment is not particularly limited, and is preferably from 5 to 60° C.

(Third Step)

In the third step, the dispersion is further dispersed using a homogenizer for the purpose of disaggregating aggregates of the pigment and stabilizing the dispersing condition of the pigment. In the second step, the pigment particles dispersed are finely divided into a desired particle size by using the media-type dispersing device. However, with the reduction in particle size of the pigment particles dispersed, the surface area and surface energy of the pigment particles are increased, so that the pigment particles are re-aggregated together to reduce the surface energy. In order to disaggregate the aggregated pigment particles and stabilize the dispersing condition of the pigment particles, it is required to subject the dispersion to further dispersing treatment.

The homogenizer serves for exhibiting a cavitation phenomenon accompanied with a high impact force and an instantaneous high pressure to disaggregate aggregates of the pigment, and also serves for preventing re-aggregation of the pigment to stabilize the dispersing condition of the pigment.

Examples of the homogenizer include an ultrasonic homogenizer and a high-pressure homogenizer. When using the ultrasonic homogenizer, the dispersion is preferably subjected to vacuum drawing, defoaming and deaeration prior to the dispersing treatment. From the viewpoint of a good utilization efficiency of the dispersion energy applied, the high-pressure homogenizer is more preferably used.

Examples of the commercially available high-pressure homogenizers usable in the present invention include homo-valve-type high-pressure homogenizers such as typically "High-Pressure Homogenizer"™ available from Izumi Food Machinery Co., Ltd., and "Mini-Labo 8.3H Model" (tradename) available from Rannie Corp., and chamber-type high-pressure homogenizers such as "Micro-Fluidizer"™ available from Microfluidics Inc., "Nanomizer"™ available from Yoshida Kikai Kogyo Co., Ltd., "Ultimizer"™ available from Sugino Machine Ltd., "Genus PY"™ available from Hakusui Kagaku Co., Ltd., and "DeBEE 2000"™ Nippon BEE Co., Ltd.

From the viewpoint of preventing re-aggregation of the pigment particles and stabilizing the dispersing condition thereof, the dispersing pressure is preferably 20 MPa or more and more preferably 50 MPa or more. Also, from the same viewpoint, the number of treating passes through the homogenizer is preferably at least 1, preferably 3 or more and more preferably 5 or more. Examples of the operating method for passing the dispersion through the homogenizer include a circulation method and a continuous method similarly to those using the media-type dispersing device in the second step. Among these methods, preferred is the continuous method, since distribution of frequency of passes is hardly caused. The temperature used upon the dispersing treatment is not particularly limited, and is preferably from 5 to 80° C.

In addition, from the viewpoints of preventing clogging of nozzles in a printer as well as attaining good printing characteristics such as good dispersion stability, gloss and image clarity, the dispersing treatment of the pigment is continued until the average particle size of the pigment after subjected to the dispersing treatment reaches preferably from 0.01 to 0.5 μm, more preferably from 0.03 to 0.3 μm and still more preferably from 0.05 to 0.2 μm.

Meanwhile, the average particle size may be measured using a laser particle analysis system "ELS-8000" (cumulant analysis) available from Otsuka Denshi Co., Ltd., under the following conditions:

Temperature: 25° C.
Angle between incident light and detector: 900
Cumulative frequency: 100 times
Refractive index of water (1.333)
Standard substance: "Uniform Microparticles" (average particle size: 204 nm) available from Seradyn Corp.

The pigment dispersion in which the pigment particles are dispersed in a finely divided and stabilized condition can be produced by conducting the above first to third steps. In order to further stabilize the pigment dispersion, it is preferred to remove the organic solvent therefrom.

The removal of the organic solvent may be conducted by ordinary methods such as distillation under normal or reduced pressures. Further, the pigment dispersion is preferably subjected to filtration or centrifugal separation to remove coarse particles therefrom. Thus, the water-based pigment dispersion of the present invention can be obtained through the above procedures.

The content of the non-volatile components in the thus obtained water-based pigment dispersion is usually adjusted to from 1 to 30% by weight and preferably from 3 to 25% by weight from the viewpoints of good optical density and ejection stability thereof.

The water-based pigment dispersion may be directly used as a water-based ink. Alternatively, the water-based pigment dispersion may be further mixed with various additives ordinarily used for water-based inks for ink-jet printing such as wetting agents, penetrants, dispersants, viscosity modifiers, defoaming agents, mildew-proof agents and rust preventives, and then the resultant dispersion can be used as a water-based ink. Thus, the water-based pigment dispersion produced by the process of the present invention can be suitably used as a water-based ink for ink-jet printing.

EXAMPLES

In the following production examples, examples and comparative examples, the "part(s)" and "%" indicate "part(s) by weight" and "% by weight", respectively, unless otherwise specified.

Production Example 1

A 5-L reaction vessel was charged with 81.8 g of methyl ethyl ketone and 0.31 g of a chain transfer agent (2-mercaptoethanol) together with 10% of 2000 g of a monomer mixture for Production Example 1 shown in Table 1. The contents of the reaction vessel were mixed with each other, and then an inside of the reaction vessel was fully purged with a nitrogen gas to thereby obtain a mixed solution.

Separately, remaining 90% of the monomer mixture for Production Example 1 shown in Table 1 was charged into a dropping funnel, and 2.78 g of the chain transfer agent (2-mercaptoethanol), 736.4 g of methyl ethyl ketone and 18.2 g of 2,2'-azobis(2,4-dimethylvaleronitrile) were added thereto and mixed with each other, and an inside of the dropping funnel was fully purged with a nitrogen gas to thereby obtain a mixed solution.

The mixed solution in the reaction vessel was heated to 75° C. under stirring in a nitrogen atmosphere, and then the mixed solution in the dropping funnel was gradually dropped thereinto over 5 h. After the elapse of 2 h at 75° C. from completion of the dropping, a solution prepared by dissolving 16.4 g of 2,2'-azobis(2,4-dimethylvaleronitrile) in 218.2 g of methyl ethyl ketone was added to the obtained solution, and the resultant reaction solution was further aged at 75° C. for 2 h and then at 80° C. for 2 h to obtain a polymer solution.

Production Example 2

The same procedure as in Production Example 1 was repeated except that the amount of the chain transfer agent (2-mercaptoethanol) charged into the reaction vessel was changed from 0.31 g to 0.45 g, the amount of the chain transfer agent (2-mercaptoethanol) charged into the dropping funnel was changed from 2.78 g to 4.09 g, and the composition of the monomer mixture was changed to that for Production Example 2 as shown in Table 1.

Production Example 3

The same procedure as in Production Example 1 was repeated except that the amount of the chain transfer agent (2-mercaptoethanol) charged into the reaction vessel was changed from 0.31 g to 0.255 g, the amount of the chain transfer agent (2-mercaptoethanol) charged into the dropping funnel was changed from 2.78 g to 2.29 g, and the composition of the monomer mixture was changed to that for Production Example 3 as shown in Table 1.

Production Example 4

The same procedure as in Production Example 1 was repeated except that the amount of methyl ethyl ketone charged into the reaction vessel was changed from 81.8 g to 90.0 g, the amount of the chain transfer agent (2-mercaptoethanol) charged into the reaction vessel was changed from 0.31 g to 0.273 g, the amount of the chain transfer agent (2-mercaptoethanol) charged into the dropping funnel was changed from 2.78 g to 2.50 g, the amount of methyl ethyl ketone charged into the dropping funnel was changed from 736.4 g to 728.2 g, and the composition of the monomer mixture was changed to that for Production Example 4 as shown in Table 1.

Comparative Production Example 1

The same procedure as in Production Example 1 was repeated except that the amount of the chain transfer agent (2-mercaptoethanol) charged into the reaction vessel was changed from 0.31 g to 0.62 g, the amount of the chain transfer agent (2-mercaptoethanol) charged into the dropping funnel was changed from 2.78 g to 5.56 g, and the composition of the monomer mixture was changed to that for Comparative Production Example 1 as shown in Table 1.

Comparative Production Example 2

The same procedure as in Production Example 1 was repeated except that the amount of the chain transfer agent (2-mercaptoethanol) charged into the reaction vessel was changed from 0.31 g to 0.20 g, the amount of the chain transfer agent (2-mercaptoethanol) charged into the dropping funnel was changed from 2.78 g to 1.80 g, and the composition of the monomer mixture was changed to that for Comparative Production Example 2 as shown in Table 1.

The weight-average molecular weight of the resultant polymer was determined in terms of a weight-average molecular weight of polystyrene by gel permeation chromatography using dimethylformamide containing 60 mmol/L of phosphoric acid and 50 mmol/L of lithium bromide as a solvent. The results are shown in Table 1.

TABLE 1

| Composition of Monomers (part) | Production Examples | | | | Comparative Production Examples | |
|---|---|---|---|---|---|---|
| | 1 | 2 | 3 | 4 | 1 | 2 |
| (a) Methacrylic acid | 11 | 11 | 11 | 13 | 11 | 11 |
| (b) Benzyl methacrylate | 49 | 49 | 49 | 47 | 49 | 49 |
| (c) Stearyl methacrylate | — | — | — | 10 | — | — |
| (d) Polyethylene glycol monomethacrylate | 10 | 15 | — | 10 | 15 | — |
| (d) Polypropylene glycol monomethacrylate | 20 | 15 | 30 | 10 | 15 | 30 |
| (e) Styrene Macromer | 10 | 10 | 10 | 10 | 10 | 10 |
| Weight-average molecular weight of polymer | 175000 | 102000 | 325000 | 158000 | 52000 | 483000 |

Meanwhile, details of the respective compounds shown in Table 1 are as follows.

Polyethylene glycol monomethacrylate (average molar number of addition of ethyleneoxide: 9): "NK-ESTER M-90G"™ available from Shin-Nakamura Kagaku Kogyo Co., Ltd.

Polypropylene glycol monomethacrylate (average molar number of addition of propyleneoxide: 12): "BLENMER PP-800"™ available from NOF Corp.

Styrene macromer: "AS-6S"™ available from Toagosei Co., Ltd.; number-average molecular weight: 6000; polymerizable functional group: methacryloyloxy group Stearyl methacrylate: "NK-ESTER S"™ available from Shin-Nakamura Kagaku Kogyo Co., Ltd.

Example 1

One hundred twelve grams of the polymer produced by drying the polymer solution obtained in Production Example 1 under reduced pressure was dissolved in 634 g of methyl ethyl ketone. Further, 25.5 g of a neutralizing agent (a 5N sodium hydroxide aqueous solution) and 1900 g of ion-exchanged water were added to the resultant solution to neutralize a salt-forming group of the polymer (degree of neutralization: 75%), thereby obtaining an emulsion composition. Then, 335 g of a diazo pigment as a yellow pigment (C.I. Pigment Yellow 74 [PY74]; "FY7413 (tradename)" available from Sanyo Pigment Co., Ltd.) was added into the reaction solution and mixed with each other at 20° C. for 1 h using disper blades, thereby obtaining a preliminary dispersion (first step).

Next, 3006.5 g of the thus obtained preliminary dispersion was subjected to dispersing treatment by a circulation method using a media-type dispersing device "ULTRA APEX MILL; Model UAM-1"™ available from Kotobuki Industries Co., Ltd., and zirconia beads having a diameter of 0.05 mm as media particles at a filing rate of beads of 80%, an agitation blade peripheral speed of 12 m/s and a circulation flow rate of 500 cc/min for 2 hr (total average retention time in mill: 15 min). The net power applied per 1 kg of the preliminary dispersion was 2.0 kw/kg, and the cumulative net power was 0.5 kwh/kg (second step) (single tank circulation method; refer to FIG. 1).

Next, in order to further stabilize the dispersing condition, the thus obtained mixture was dispersed by a continuous method under a pressure of 180 MPa by passing through a high-pressure homogenizer "MICROFLUIDIZER"™ available from Microfluidics Corp., 10 times (third step).

The resultant dispersion mixture was mixed with 1503 g of ion-exchanged water and stirred, and then methyl ethyl ketone was removed from the resultant mixture under reduced pressure using a 60° C. hot water heating medium, followed by further removing a part of the water therefrom. The obtained mixture was filtered through a 5 μm-mesh filter (acetyl cellulose membrane; outer diameter: 2.5 cm; available from Fujifilm Corporation) fitted to a 25 mL syringe without a needle available from Terumo Corporation, to remove coarse particles therefrom, thereby obtaining a water-based pigment dispersion having a solid content of 20%.

Forty parts of the thus obtained water-based pigment dispersion, 10 parts of glycerol, 7 parts of triethylene glycol monobutyl ether (TEGMBE), 1 part of "SURFYNOL 465" available from Nissin Chemical Industry Co., Ltd., 0.3 part of "Ploxel XL2" available from Avecia KK and 41.7 parts of ion-exchanged water, and the resultant mixed solution was filtered through a 1.2 μm-mesh filter (acetyl cellulose membrane; outer diameter: 2.5 cm; available from Fujifilm Corporation) fitted to a 25 mL syringe without a needle to remove coarse particles therefrom, thereby obtaining a water-based ink as shown in Table 2.

Example 2

The same procedure as in Example 1 was repeated except for using the polymer obtained in Production Example 2 in place of the polymer obtained in Production Example 1, thereby obtaining a water-based ink.

Example 3

The same procedure as in Example 1 was repeated except for using the polymer obtained in Production Example 3 in place of the polymer obtained in Production Example 1, thereby obtaining a water-based ink.

Example 4

The same procedure as in Example 1 was repeated except for using the polymer obtained in Production Example 4 in place of the polymer obtained in Production Example 1, thereby obtaining a water-based ink.

Example 5

The same procedure as in Example 1 was repeated except for using an unsubstituted quinacridone pigment as a magenta pigment (C.I. Pigment Violet 19 [PV19]; "Hostaperm Red E5B02"™ available from Clariant Japan Co., Ltd.) in place of the yellow pigment, thereby obtaining a water-based ink.

Example 6

The same procedure as in Example 1 was repeated except for using a phthalocyanine pigment as a cyan pigment (C.I. Pigment Blue 15:4 [PB15:4]; "LIONOGEN BLUE BGJ"™ available from Toyo Ink Seizo Co., Ltd.) in place of the yellow pigment, thereby obtaining a water-based ink.

Example 7

The same procedure as in Example 5 was repeated except that the amounts of methyl ethyl ketone and ion-exchanged water used in the first step were changed to 852 g and 1682 g, respectively, and the weight ratio of methyl ethyl ketone to water [methyl ethyl ketone/water] was changed to 0.51, thereby obtaining a water-based ink.

Example 8

The same procedure as in Example 1 was repeated except that the diameter of the media beads used in the second step was changed from 0.05 mmφ to 0.2 mmφ, thereby obtaining a water-based ink.

Example 9

The same procedure as in Example 1 was repeated except that the "Microfluidizer" used in the third step was changed to "Ultimizer"™ available from Sugino Machine Ltd., thereby obtaining a water-based ink.

Example 10

The same procedure as in Example 1 was repeated except that the circulation dispersing treatment time used in the second step was changed from 2 h to 4 h (total average retention time in mill: 30 min), and the cumulative net power applied per 1 kg of the preliminary dispersion was changed to 1.0 kwh/kg, thereby obtaining a water-based ink.

Example 11

The same procedure as in Example 1 was repeated except that the operating method used in the second step was changed from the circulation method to the continuous method (twin tank liquid feedback method; refer to FIG. 2), thereby obtaining a water-based ink.

Comparative Example 1

The same procedure as in Example 1 was repeated except for using the polymer obtained in Comparative Production Example 1 in place of the polymer obtained in Production Example 1, thereby obtaining a water-based ink.

Comparative Example 2

The same procedure as in Example 1 was repeated except for using the polymer obtained in Comparative Production Example 2 in place of the polymer obtained in Production Example 1, thereby obtaining a water-based ink.

Comparative Example 3

The same procedure as in Example 1 was repeated except that no dispersing treatment was conducted in the second step, thereby obtaining a water-based ink.

Comparative Example 4

The same procedure as in Example 4 was repeated except that no dispersing treatment was conducted in the second step, thereby obtaining a water-based ink.

Comparative Example 5

The same procedure as in Example 5 was repeated except that no dispersing treatment was conducted in the third step, thereby obtaining a water-based ink. As a result, it was confirmed that the thus obtained water-based ink was aggregated and deteriorated in storage stability.

Comparative Example 6

The same procedure as in Example 1 was repeated except that the weight ratio of methyl ethyl ketone to water [methyl ethyl ketone/water] used in the first step was changed from 0.33 to 1.0. However, the dispersion underwent increase in viscosity thereof in the course of the second step using the beads mill, thereby failing to attain a well-dispersed condition.

Comparative Example 7

The same procedure as in Example 1 was repeated except that the circulation dispersing treatment time used in the second step was changed from 2 h to 20 min (total average retention time in mill: 2.5 min), and the cumulative net power applied per 1 kg of the preliminary dispersion was changed to 0.08 kwh/kg, thereby obtaining a water-based ink.

Comparative Example 8

The same procedure as in Example 1 was repeated except that the dispersing treatment time used in the second step was changed from 2 h to 12 h (total average retention time in mill: 90 min), and the cumulative net power applied per 1 kg of the preliminary dispersion was changed to 3.0 kwh/kg, thereby obtaining a water-based ink.

Comparative Example 9

Figure 3:
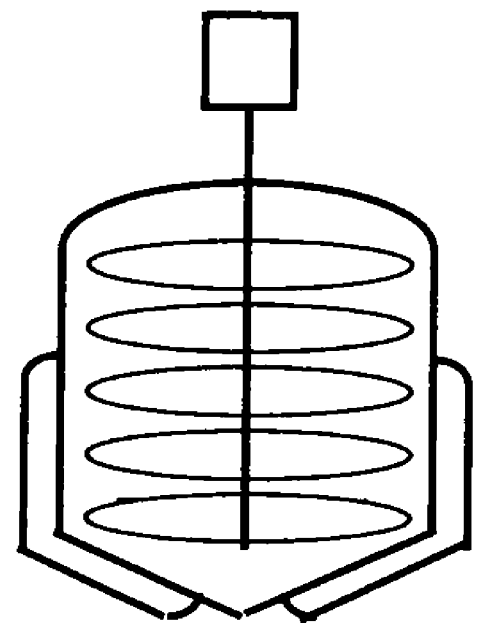
FIG. 3 is a schematic view showing a batch method used in Comparative Example 9.

The second step was conducted in the same manner as in Example 4 except that the media-type dispersing device of a continuous type for continuously dispersing the dispersion and continuously separating the media particles therefrom was changed to a media-type dispersing device of a batch type (sand grinder "MODEL 6TSG-1/4" available from Aimex Co., Ltd.). Specifically, a 1-L pot-shaped container was charged with 230 g of the preliminary dispersion obtained in the first step and 1.9 kg of zirconia beads having a particle size of 0.05 mm as media particles, and the contents of the container was subjected to batch dispersing treatment under cooling at an agitation blade peripheral speed of 8 m/s for 30 min (total average retention time in mill: 30 min). The net power applied per 1 kg of the preliminary dispersion was 1.1 kw/kg, and the cumulative net power was 0.55 kwh/kg. Meanwhile, since the 1-L pot was not a closed container, the above dispersion and the media beads were charged therein so as not to be spilt therefrom, and the volume ratio of the dispersion to the beads was adjusted to 3:7 (corresponding to a filling rate of beads of 70%) (batch method; refer to FIG. 3).

The third step was conducted in the same manner as in Example 4, and the obtained dispersion mixture was mixed with 115 g of ion-exchanged water. The subsequent procedure was conducted in the same manner as in Example 4, thereby obtaining a water-based ink.

Next, ink characteristics of the respective water-based inks obtained in Examples 1 to 10 and Comparative Examples 1 to 9 were measured by the following methods. The results are shown in Tables 2 and 3.

The abbreviations used for the "Dispersing Device" appearing in Tables 2 and 3 have the following meanings.

BM: Beads mill "Ultra Apex Mill"™ available from Kotobuki Industries Co., Ltd.

SG: Sand grinder "MODEL 6TSG-1/4" available from Aimex Co., Ltd.

MF: Homogenizer "Micro-Fluidizer" (tradename; media-type dispersing device) available from Microfluidics Inc.

ULT: Homogenizer "Ultimizer"™ available from Sugino Machine Ltd.

(1) Storage Stability (Change in Viscosity)

The viscosity values of a sample to be measured before and after allowing the sample to stand under heating in a 60° C. constant-temperature oven for 30 days were measured using an E-type viscometer "Model RE 80" available from Toki Sangyo Co., Ltd. The measurement results are evaluated according to the following evaluation criteria.

[Evaluation Criteria]

○: Rate of change in viscosity between before and after the heat-standing test: less than 5%

Δ: Rate of change in viscosity between before and after the heat-standing test: not less than 5% but less than 8% x: Rate of change in viscosity between before and after the heat-standing test: not less than 8%

(2) Storage Stability (Change in Particle Size)

The average particle sizes of a sample to be measured before and after allowing the sample to stand under heating in a 60° C. constant-temperature oven for 30 days were measured by using a laser particle analyzing system "ELS-8000" (cumulant analysis) available from Otsuka Denshi Co., Ltd. The measurement results are evaluated according to the following evaluation criteria. Meanwhile, the measurement was conducted at a temperature of 25° C., an angle between incident light and detector of 90° and a cumulative frequency of 100 times, and a refractive index of water (1.333) was input to the analyzing system as a refractive index of the dispersing medium.

[Evaluation Criteria]

○: Rate of change in particle size between before and after the heat-standing test: less than 10%

Δ: Rate of change in particle size between before and after the heat-standing test: not less than 10% but less than 20% x: Rate of change in particle size between before and after the heat-standing test: not less than 20%

(3) Optical Density

Solid image printing was carried out on a plain paper (plain paper "Premium-Multipurpose (tradename)" available from Xerox Corp.) using an ink-jet printer "Model PX-V600" available from Seiko Epson Co., Ltd., under the following printing conditions:

Kind of Paper: Plain Paper; and

Mode set: Photo.

After allowing the printed paper to stand at 25° C. for 24 h, the optical density thereof was measured 5 times at 25° C. using a Macbeth densitometer "RD914" (product number) available from Gretag-Macbeth Corp., to obtain an average of the measured values.

(4) Gloss

Solid image printing was carried out on a coated paper (photographic paper <glossy> "KA450PSK (tradename)" available from Seiko Epson Co., Ltd.) using the above ink-jet printer under the following printing conditions:
Kind of Paper: Photo Printing Paper; and
Mode set: Photo.

After allowing the printed paper to stand at 25° C. for 24 h, the 20° gloss thereof was measured 5 times at 25° C. using a glossmeter "HANDY GLOSSMETER" (tradename; product number: PG-1) available from Nippon Denshoku Industries Co., Ltd., to obtain an average of the measured values.

(5) Rubbing Resistance

Solid image printing was carried out on the above coated paper using the above ink-jet printer and dried at 25° C. for 24 h. Then, the printed surface of the paper was strongly rubbed with fingers to evaluate rubbing-off of the printed images according to the following evaluation criteria.

[Evaluation Criteria]

○: Substantially no rubbing-off of printed images, and no contamination of surrounding portions Δ: Slight rubbing-off of printed images as well as slight contamination of surrounding portions and fingers x: Considerable rubbing-off of printed images, and severe contamination of surrounding portions and fingers

TABLE 2

| | Examples | | | | | |
|---|---|---|---|---|---|---|
| Water-based ink | 1 | 2 | 3 | 4 | 5 | 6 |
| Pigment: C.I. Pigment No. | PY74 | PY74 | PY74 | PY74 | PV19 | PB15:4 |
| Polymer | | | | | | |
| Production Example No. of polymer used | Pro. Ex. 1 | Pro. Ex. 2 | Pro. Ex. 3 | Pro. Ex. 4 | Pro. Ex. 1 | Pro. Ex. 1 |
| Weight-average molecular weight | 175000 | 102000 | 325000 | 158000 | 175000 | 175000 |
| Degree of neutralization (%) | 75 | 75 | 75 | 75 | 75 | 75 |
| Dispersing conditions | | | | | | |
| Concentration of first step | 15 | 15 | 15 | 15 | 15 | 15 |
| Ratio of MEK/water in first step | 0.33 | 0.33 | 0.33 | 0.33 | 0.33 | 0.33 |
| Dispersing device used in second step | BM | BM | BM | BM | BM | BM |
| Particle size of media used in second step (mm) | 0.05 | 0.05 | 0.05 | 0.05 | 0.05 | 0.05 |
| Net power in second step (kw/kg) | 2.0 | 2.0 | 2.0 | 2.0 | 2.0 | 2.0 |
| Cumulative net power in second step (kwh/kg) | 0.5 | 0.5 | 0.5 | 0.5 | 0.5 | 0.5 |
| Operating method for second step | Circ.* | Circ.* | Circ.* | Circ.* | Circ.* | Circ.* |
| Dispersing device used in third step | MF | MF | MF | MF | MF | MF |
| Evaluation of dispersion | | | | | | |
| Storage stability (rate of change in particle size) (%) | ○ (101) | ○ (103) | ○ (106) | ○ (103) | ○ (102) | ○ (99) |
| Storage stability (rate of change in viscosity) (%) | ○ (97) | ○ (98) | ○ (99) | ○ (100) | ○ (101) | ○ (96) |
| Evaluation of printing | | | | | | |
| Optical density | 1.15 | 1.10 | 1.11 | 1.14 | 1.08 | 1.10 |
| Gloss | 121 | 120 | 115 | 125 | 86 | 76 |
| Rubbing resistance | ○ | ○ | ○ | ○ | ○ | ○ |

| | Examples | | | | |
|---|---|---|---|---|---|
| Water-based ink | 7 | 8 | 9 | 10 | 11 |
| Pigment-C.I. Pigment No. | PB15:4 | PY74 | PY74 | PY74 | PY74 |
| Polymer | | | | | |
| Production Example No. of polymer used | Pro. Ex. 1 | Pro. Ex. 1 | Pro. Ex. 1 | Pro. Ex. 1 | Pro. Ex. 1 |
| Weight-average molecular weight | 175000 | 175000 | 175000 | 175000 | 175000 |

TABLE 2-continued

| | | | | | |
|---|---|---|---|---|---|
| Degree of neutralization (%) | 75 | 75 | 75 | 75 | 75 |
| Dispersing conditions | | | | | |
| Concentration of first step | 15 | 15 | 15 | 15 | 15 |
| Ratio of MEK/water in first step | 0.51 | 0.33 | 0.33 | 0.33 | 0.33 |
| Dispersing device used in second step | BM | BM | BM | BM | BM |
| Particle size of media used in second step (mm) | 0.05 | 0.2 | 0.05 | 0.05 | 0.05 |
| Net power in second step (kw/kg) | 2.0 | 2.0 | 2.0 | 2.0 | 2.0 |
| Cumulative net power in second step (kwh/kg) | 0.5 | 0.5 | 0.5 | 1.0 | 0.5 |
| Operating method for second step | Circ.* | Circ.* | Circ.* | Circ.* | Cont.** |
| Dispersing device used in third step | MF | MF | ULT | MF | MF |
| Evaluation of dispersion | | | | | |
| Storage stability (rate of change in particle size) (%) | ○ (104) | ○ (104) | ○ (103) | ○ (105) | ○ (102) |
| Storage stability (rate of change in viscosity) (%) | ○ (105) | ○ (99) | ○ (102) | ○ (108) | ○ (99) |
| Evaluation of printing | | | | | |
| Optical density | 1.11 | 1.12 | 1.13 | 1.14 | 1.15 |
| Gloss | 72 | 110 | 120 | 112 | 130 |
| Rubbing resistance | ○ | ○ | ○ | ○ | ○ |

Note
Circ.*: Circulation method;
Cont.**: Continuous method

TABLE 3

| | Comparative Examples | | | | |
|---|---|---|---|---|---|
| Water-based ink | 1 | 2 | 3 | 4 | 5 |
| Pigment: C.I. Pigment No. | PY74 | PY74 | PY74 | PV19 | PB15:4 |
| Polymer | | | | | |
| Production Example No. of polymer used | Com. Pro. Ex. 1 | Com. Pro. Ex. 2 | Pro. Ex. 1 | Pro. Ex. 1 | Pro. Ex. 1 |
| Weight-average molecular weight | 52000 | 483000 | 175000 | 175000 | 175000 |
| Degree of neutralization (%) | 75 | 75 | 75 | 75 | 75 |
| Dispersing conditions | | | | | |
| Concentration of first step | 15 | 15 | 15 | 15 | 15 |
| Ratio of MEK/water in first step | 0.33 | 0.33 | 0.33 | 0.33 | 0.33 |
| Dispersing device used in second step | BM | BM | None | None | BM |
| Particle size of media used in second step (mm) | 0.05 | 0.05 | — | — | 0.05 |
| Net power in second step (kw/kg) | 2.0 | 2.0 | — | — | 2.0 |
| Cumulative net power in second step (kwh/kg) | 0.5 | 0.5 | — | — | 0.5 |
| Operating method for second step | Circ.* | Circ.* | — | — | Circ.* |
| Dispersing device used in third step | MF | MF | MF | MF | None |

TABLE 3-continued

| Evaluation of dispersion | | | | | |
|---|---|---|---|---|---|
| Storage stability (rate of change in particle size) (%) | Δ (115) | Δ (117) | ○ (108) | ○ (109) | X (385) |
| Storage stability (rate of change in viscosity) (%) | X (110) | X (108) | Δ (106) | Δ (107) | X (339) |
| Evaluation of printing | | | | | |
| Optical density | 1.14 | 1.18 | 1.12 | 1.05 | 1.08 |
| Gloss | 118 | 114 | 93 | 67 | 61 |
| Rubbing resistance | ○ | Δ | Δ | Δ | Δ |

| | Comparative Examples | | | |
|---|---|---|---|---|
| Water-based ink | 6 | 7 | 8 | 9 |
| Pigment: C.I. Pigment No. | PY74 | PY74 | PY74 | PV19 |
| Polymer | | | | |
| Production Example No. of polymer used | Pro. Ex. 1 | Pro. Ex. 1 | Pro. Ex. 1 | Pro. Ex. 1 |
| Weight-average molecular weight | 175000 | 175000 | 175000 | 175000 |
| Degree of neutralization (%) | 75 | 75 | 75 | 75 |
| Dispersing conditions | | | | |
| Concentration of first step | 15 | 15 | 15 | 15 |
| Ratio of MEK/water in first step | 1.0 | 0.33 | 0.33 | 0.33 |
| Dispersing device used in second step | BM | BM | BM | SG |
| Particle size of media used in second step (mm) | 0.05 | 0.05 | 0.05 | 0.05 |
| Net power in second step (kw/kg) | — | 2.0 | 2.0 | 1.1 |
| Cumulative net power in second step (kwh/kg) | — | 0.08 | 3.0 | 0.55 |
| Operating method for second step | Circ.* | Circ.* | Circ.* | Batch |
| Dispersing device used in third step | — | MF | MF | MF |
| Evaluation of dispersion | | | | |
| Storage stability (rate of change in particle size) (%) | — | ○ (108) | X (155) | X (132) |
| Storage stability (rate of change in viscosity) (%) | — | Δ (106) | X (210) | X (182) |
| Evaluation of printing | | | | |
| Optical density | — | 1.12 | 1.12 | 1.05 |
| Gloss | — | 95 | 93 | 61 |
| Rubbing resistance | — | X | Δ | Δ |

Note
Circ.*: Circulation method

From the results shown in Tables 2 and 3, it was confirmed that the water-based inks obtained in the respective Examples exhibited a satisfactory optical density when printed on a plain paper, as well as excellent gloss and rubbing resistance when printed on a coated paper as compared to those water-based inks obtained in the Comparative Examples.

INDUSTRIAL APPLICABILITY

In accordance with the present invention, the water-based pigment dispersion not only satisfying a high optical density but also exhibiting excellent gloss and rubbing resistance when printed on a coated paper which contains fine pigment particles in a stabilized condition can be produced in an efficient manner.

In addition, the water-based ink containing the thus produced water-based pigment dispersion can be suitably used for ink-jet printing.

What is claimed is:
1. A process for producing a water-based pigment dispersion comprising:
   (1) mixing (A) an emulsion composition comprising a water-insoluble polymer having a weight-average molecular weight of from 90,000 to 400,000 and comprising a salt-forming group, an organic solvent having a solubility in 100 g of water of from 5 to 40% by weight as measured at 20° C., a neutralizing agent and water, with (B) a pigment, to obtain a preliminary dispersion having a content of non-volatile components of from 5 to 50% by weight of the preliminary dispersion and a weight ratio of the organic solvent to water (organic solvent/water) of from 0.1 to 0.9;

(2) continuously dispersing the preliminary dispersion by using a media particle-containing dispersing device and continuously separating the resultant dispersion from media particles; and (3) further dispersing the resultant dispersion by using a homogenizer.

2. The process according to claim 1, wherein the media particles used in step (2) have a particle size of from 0.01 to 0.25 mm.

3. The process according to claim 1, wherein the preliminary dispersion is dispersed in step (2) by using the media particle-containing dispersing device, wherein a cumulative net power applied per 1 kg of the preliminary dispersion is in the range of from 0.1 to 2 kwh/kg.

4. The process according to claim 1, wherein step (2) is operated by a circulation method or a continuous method.

5. The process according to claim 1, wherein the homogenizer used in step (3) is a high-pressure homogenizer.

6. The process according to claim 1, wherein in step (1), the pigment (B) is added to and mixed with the emulsion composition (A).

7. The process according to claim 1, wherein the organic solvent used in step (1) is methyl ethyl ketone.

8. The process according to claim 1, wherein the water-insoluble polymer is a water-insoluble graft polymer comprising a main chain that is a polymer chain at least comprising a constitutional unit derived from a salt-forming group-containing monomer (a) and a constitutional unit derived from an aromatic ring-containing (meth)acrylate monomer (b), and a side chain that is a polymer chain comprising at least a constitutional unit derived from a hydrophobic monomer (e).

* * * * *